United States Patent
Symes et al.

(10) Patent No.: US 11,620,901 B1
(45) Date of Patent: Apr. 4, 2023

(54) SHORT-TERM TRAFFIC SPEED PREDICTION AND FORECASTING USING MACHINE LEARNING ANALYSIS OF SPATIOTEMPORAL TRAFFIC SPEED DEPENDENCIES IN PROBE AND WEATHER DATA

(71) Applicant: ITERIS, INC., Santa Ana, CA (US)

(72) Inventors: Tiffany E. Symes, Santa Ana, CA (US); Pouyan Hosseini, Woodland Hills, CA (US); Shayan Khoshmagham, San Francisco, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 17/831,361

(22) Filed: Jun. 2, 2022

(51) Int. Cl.
| | |
|---|---|
| G08G 1/00 | (2006.01) |
| G08G 1/01 | (2006.01) |
| G01W 1/10 | (2006.01) |
| G06N 3/04 | (2023.01) |
| G08G 1/052 | (2006.01) |
| G01W 1/14 | (2006.01) |

(52) U.S. Cl.
CPC ............ *G08G 1/0133* (2013.01); *G01W 1/10* (2013.01); *G01W 1/14* (2013.01); *G06N 3/04* (2013.01); *G08G 1/0112* (2013.01); *G08G 1/0129* (2013.01); *G08G 1/0145* (2013.01); *G08G 1/052* (2013.01)

(58) Field of Classification Search
CPC ............... G08G 1/0133; G08G 1/0112; G08G 1/0129; G08G 1/0145; G08G 1/052; G01W 1/10; G01W 1/14; G06N 3/04
See application file for complete search history.

(56) References Cited

U.S. PATENT DOCUMENTS

| 9,349,285 B1 * | 5/2016 | Fowe ............... G08G 1/096827 |
| 9,536,146 B2 * | 1/2017 | Zheng .................. G06V 30/422 |
| 2019/0204101 A1 * | 7/2019 | Macrae .................. G06Q 50/30 |

FOREIGN PATENT DOCUMENTS

| WO | WO-0201532 A1 * | 1/2002 | ............. G08G 1/012 |

* cited by examiner

*Primary Examiner* — Peter D Nolan
*Assistant Examiner* — Demetra R Smith-Stewart
(74) *Attorney, Agent, or Firm* — Lazaris IP, Inc.

(57) ABSTRACT

A framework for modeling traffic speed in a transportation network analyzes both the spatial and temporal dependencies in probe-based traffic speeds, historical weather data, and forecasted weather data, using multiple machine learning models. A decentralized partial least squares (PLS) regression model predicts short-term speed using localized, historical probe-based traffic data, and a deep learning model applies the predicted short-term speed to further estimate traffic speed at specified times and at specific locations in the transportation network for predicting traffic bottlenecks and other future traffic states.

30 Claims, 3 Drawing Sheets

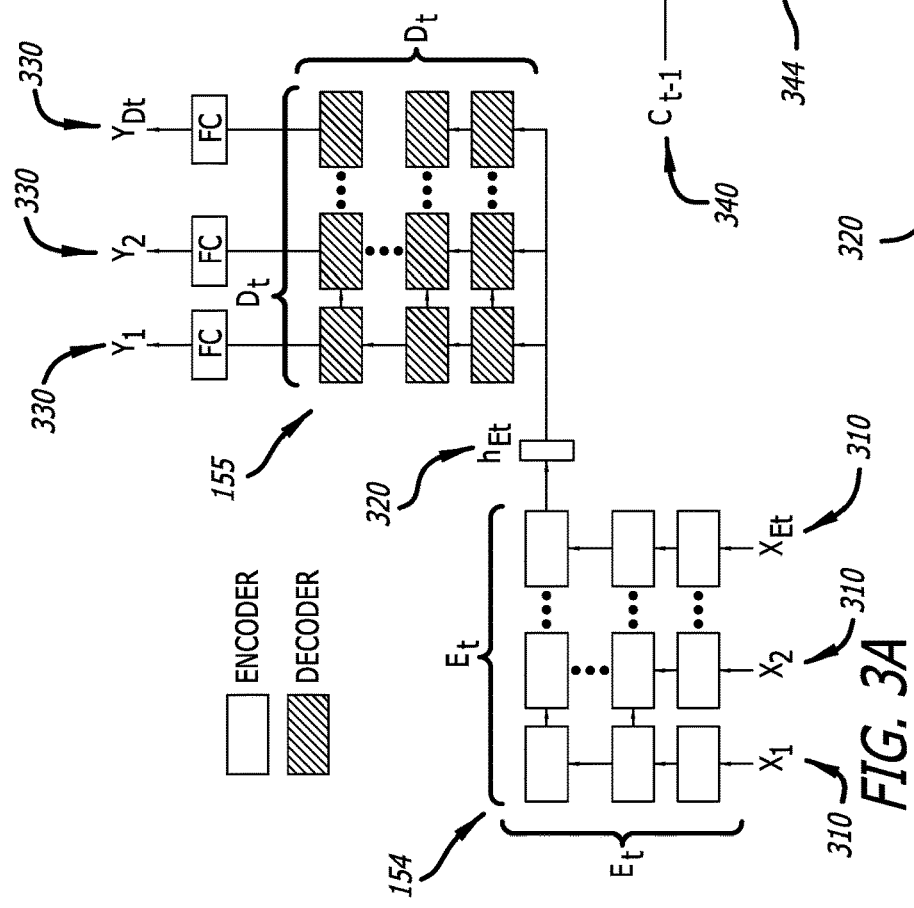

SHORT-TERM TRAFFIC SPEED PREDICTION AND FORECASTING USING MACHINE LEARNING ANALYSIS OF SPATIOTEMPORAL TRAFFIC SPEED DEPENDENCIES IN PROBE AND WEATHER DATA

FIELD OF THE INVENTION

The present invention relates generally to the field of traffic management. More specifically, the present invention relates to systems and methods of analyzing link-based speed data and weather data using machine learning models to estimate traffic speed, and provide predictions and forecasts of traffic conditions based on estimates of traffic speed at specific locations and at specific times within a transportation network.

BACKGROUND OF THE INVENTION

Traffic speed monitoring is a major issue in today's urban communities, and there are many approaches for monitoring, analyzing, and characterizing traffic speed within transportation networks and the various links that comprise such networks. These approaches make use of large amounts of available traffic data, which has made it possible to analyze and control urban traffic more effectively. Traffic congestion prediction, and specifically short-term speed and travel time prediction, has attracted significant attention because it can be readily provided to roadway users through Advanced Traveler Information Systems (ATIS) and through mobile applications on user computing devices. Short-term traffic information can also be utilized by traffic management centers to control traffic in a more dynamic and responsive manner. Despite these advances however, it remains that traffic state prediction still needs improvement in terms of accuracy, computational efficiency, and scalability.

Traffic data science, which includes the study of these large amounts of available traffic data, has matured and expanded to now include a greater number of input data sources that are used to train and deploy predictive models. Although much research has gone into developing applications of short-term traffic state prediction, there has been little emphasis on the importance of particular types of input data sources in this domain, and their spatio-temporal impact on traffic states, for example the importance of weather-related data analytics. Currently-available techniques for traffic speed monitoring do not accurately utilize weather data attributes (e.g. precipitation, wind speed, visibility, etc.) together with the traffic speed data in prediction of future traffic states. Other types of data sources may also be important for accurately predicting future traffic states, such as incident data and its spatial and temporal impact on traffic speed. Current approaches in traffic data science therefore do not fully account for dependencies across time and space that affect conditions such as traffic speed Traffic bottlenecks are one example where more accurate predictions based on traffic speed dependencies can produce improvements in transportation management. Bottlenecks are locations on a roadway where there is a temporary or permanent drop in capacity (defined as the maximum number of vehicle throughput per second) compared to immediately-adjacent downstream locations on the same roadway. The detection and removal of bottlenecks is important for organizations responsible for managing transportation networks, such as state departments of transportation or private entities operating toll roads. Bottlenecks can lead to traffic congestion and the formation of a queue of slow or stopped vehicles behind, or upstream of, the bottleneck. These organizations have an interest in knowing where a bottleneck will occur, how long the queue of vehicles behind it will be, and how long it will persist over a given period of time.

Traffic flow forecasting and short-term traffic state prediction general involves the application of mathematical formulas and models. These include the use of time series models (such as autoregressive moving average (ARMA) and autoregressive integrated moving average (ARIMA) models) and statistical approaches, such as regression models to estimate link travel time using inductive loop detector data, based on both real-time and historical link travel time profiles. For example, linear regression has been used to predict the nonlinear time series of travel time; such regression models however require storing too many parameters, and need to be periodically retrained.

Other commonly-used techniques used in traffic state prediction are non-parametric approaches, such as a Kalman filter and a k-nearest neighbor (k-NN) algorithm, as well as machine learning approaches, such as decision trees and single vector machine (SVM), but none of these fully account for either the spatial or the temporal nature of traffic speed dependency, and therefore do not provide traffic managers with a reliable analysis of traffic states when used to make predictions. Other machine learning techniques have been explored to predict link-based congestion that attempt to solve for spatial and temporal dependencies, such as neural networks and models that attempt to apply deep learning techniques within such networks; these include Restricted Boltzman Machines and neural network variations such as Recurrent Neural Networks (RNNs), where the congestion is a binary variable based on the fixed speed threshold. However, in these models the matrix rows of link-based speed data are independent, such that when generally applied the models do not account for the interaction between adjacent roadway segments or the impact of traffic combinations across different links.

Still other machine learning approaches include Convolutional Neural Networks (CNNs), which consider the immediate past and a large volume of historical data, and long short-term memory (LSTM) networks, which capture long-term temporal dependency for short-term speed prediction, but do not consider the spatial dependency of traffic segments. Regardless of the specific type, machine learning approaches require large amounts of training data in order to obtain reasonable prediction performance, particularly when the problems involve complex dynamical systems. Such approaches also require large amounts of computational resources at least in processing capacity and bandwidth in order to make such predictions, and therefore have not been widely applied to a degree of success warranting widespread utility.

Accordingly, there is a need in the existing art for improvements in traffic-related data science that are able to model different types of data to produce more accurate predictions of future traffic states for transportation management. There is a further need in the existing art for improvements in modeling historical and real-time data for predicting future traffic states that accounts for both spatial and temporal dependencies in traffic speed, and still a further need for improvements in such modeling to account for large volumes of data while still being computationally efficient and producing reliable, actionable, and timely traffic predictions.

BRIEF SUMMARY OF THE INVENTION

Traffic problems, such as congestion due to bottlenecks, often aggravate and/or influence traffic conditions within a wider transportation network comprised of multiple links, and are often not limited to a single segment or even a linear sequence of links. Traffic bottlenecks are directly relative to vehicular speed, and therefore slowdowns in traffic speed over time, combined with the spatial impact across multiple links or segments, means that traffic speed must be analyzed across both time and space to produce more accurate predictions of traffic conditions and resulting states of a transportation network.

The present invention provides a traffic speed modeling framework for precision traffic analysis, for predicting traffic speed and forecasting traffic states within transportation networks. This traffic speed modeling framework is provided in one or more systems and methods for developing short-term traffic predictions of traffic speed based at least on previously-recorded link-based traffic data and weather data. The traffic speed modeling framework applies machine learning algorithms, and deep learning techniques within such algorithms, to assess spatio-temporal dependencies affecting traffic speed in such traffic data and weather data to generate predictions of traffic speed that are used to predict the occurrence of bottlenecks and forecast future traffic states.

The traffic speed modeling framework applies a multi-part data processing approach in which a partial least squares regression (PLS) is used to model the predictor space, by constructing a predictors matrix that maps historical speed to future traffic speed to assess the short-term speed for a given link. The framework then applies the output of this matrix to a deep learning model comprised of neural networks having an encoder-decoder sequence-to-sequence architecture to analyze spatial and temporal dependencies impacting the short-term speed, and calculate traffic speed at each link of the transportation network from this deep learning model. This output is then applied to generate predictions of congestion-related conditions such as traffic bottlenecks, and forecast future traffic states within the transportation network.

It is therefore one objective of the present invention to provide systems and methods of assessing traffic speed within a transportation network. It is another objective of the present invention to provide systems of methods of assessing traffic speed using varied data sources that enable accounting for spatial and temporal dependencies in traffic speed. It is another objective of the present invention to provide systems and methods of assessing traffic speed that produce reliable, accurate, and timely predictions of traffic speed based on such spatial and temporal dependencies. It is yet a further objective of the present invention to provide systems and methods of assessing traffic speed that incorporate a processing framework that includes a regression model and a deep learning model for extracting such reliable, accurate, and time predictions from the multiple types of input data being analyzed.

It is still a further objective to provide a framework for utilizing predictions of traffic speed to assess future traffic states within such a transportation network. It is yet a further objective to provide a framework for estimating traffic speed, and for generating predictions of traffic bottlenecks, and other forecasts of future traffic states at specified times, within such a transportation network.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 3A and FIG. 3B are schematic illustrations of a sequence-to-sequence architecture for a deep learning model for estimating traffic speed in a transportation network, according to one embodiment of the present invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention, as noted above, provides a traffic speed modeling framework 100 that is embodied in one or more systems and methods for predicting speed in a transportation network 102, and for utilizing such traffic speed predictions to further predict and forecast traffic states, such as bottlenecks, at specific locations and at specified times within such a transportation network 102. The traffic speed modeling framework 100 analyzes input data 110 that at least includes localized, historical link-based speed information and weather information for one or more geographical areas comprising the transportation network 102, and applies this input data 110 to a set of machine learning-based models configured to estimate traffic speed 160 and realize improvements in traffic conditions within the transportation network 102.

Figure 1:
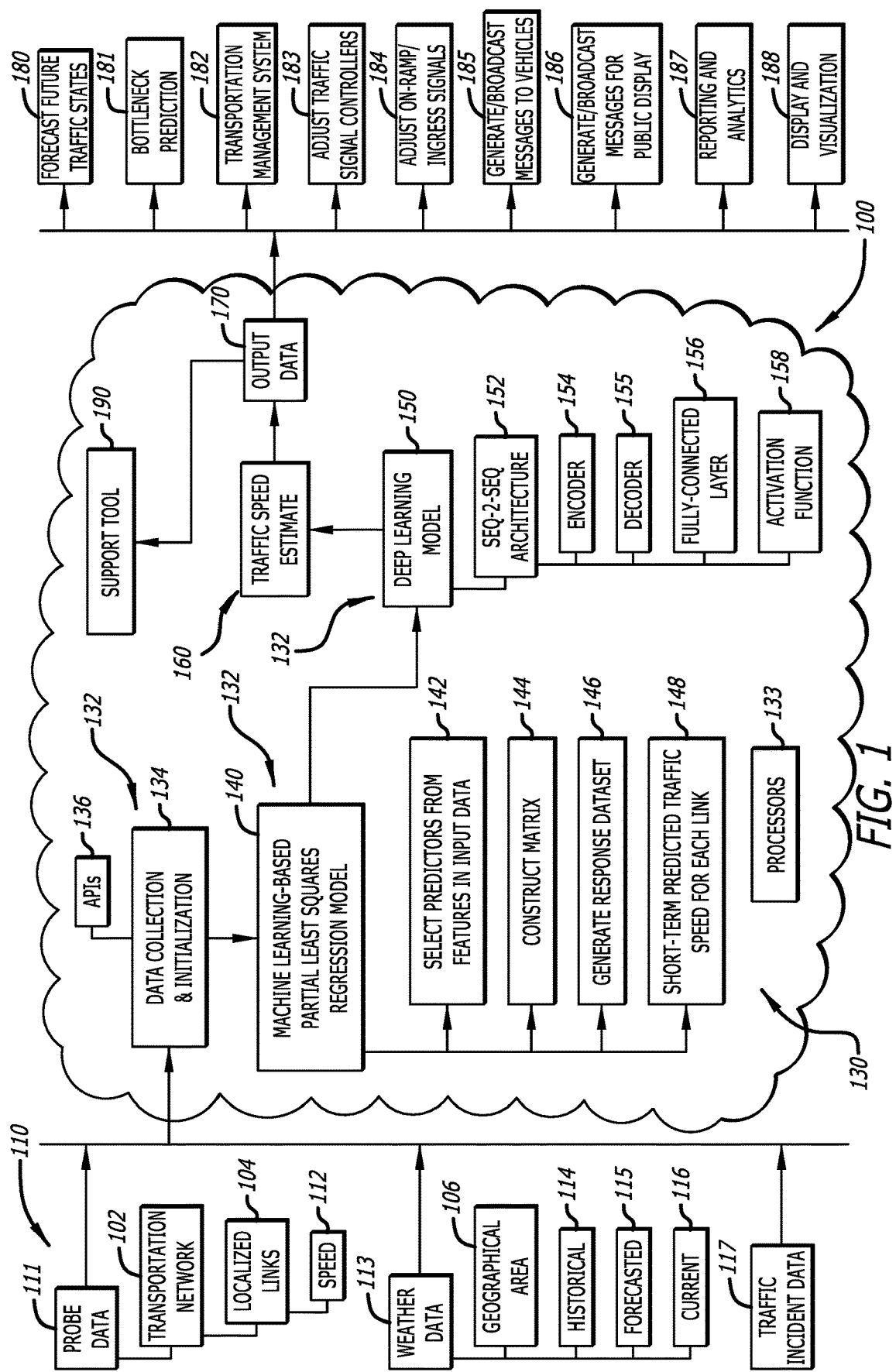
FIG. 1 is a systemic diagram illustrating elements of a traffic speed modeling framework according to the present invention.

FIG. 1 shows a system diagram of traffic speed modeling framework 100, which is performed within one or more systems and/or methods that includes several components, each of which define distinct activities and functions for processing input data 110 that at least includes link-based probe data 111 and weather data 113. The traffic speed modeling framework 100 predicts short-term traffic speed 148 for each link 104, and estimates traffic speed 160 for specific locations and at specific times, by performing various mathematical calculations and executing various algorithms within the set of machine learning-based models, and further generates predictions and forecasts of traffic states within a transportation network 102.

The traffic speed modeling framework 100 ingests, receives, requests, or otherwise obtains the input data 110 from a plurality of different sources, which may be either proprietary capturing systems or traffic detection systems, third-party sources, or both. For example, link-based probe data 111 may be obtained by one or more capturing sensors, such as those positioned in or near a roadway or traffic intersection. Such sensors may include, for example, ranging or radar systems, imaging systems such as cameras (including RGB, video, or thermal cameras), magnetometers, acoustic sensors, loops, ultrasonic sensors, piezoelectric sensors, air pressure tubes, and any other sensors, devices or systems which are capable of detecting a presence of objects and for accumulating speed information, and data obtained from such sensors may be provided via calls to one or more application programming interfaces (APIs) 136. Link-based probe data 111 may also be provided by third-party sources, and such information may be ingested into the traffic speed modeling framework 100 in many different wants, for example via one or more API 136 calls. Similarly, weather data 113 may also be collected by proprietary systems or provided by third-party sources as described further herein, and ingested into the traffic speed modeling framework 100 in many different ways, again for example via one or more API 136 calls.

Link-based probe data 111 represents traffic speed 112 for localized links 104 of a transportation network 102. Links 104 represent roadway segments that comprise a transportation network 102, and probes, as noted below, may be sensors or other capturing systems which sense or otherwise collect information pertaining to traffic speed 112 for each link 104. Weather data 113 includes meteorological and climatological information for a geographical area 106 that comprises a particular transportation network 102, and may represent historical weather information 114, predicted and/or forecasted weather information 115 representative of assessments of localized weather conditions such as long-range climatological and/or meteorological forecasting provided by one or more predictive weather models, and real-time or current weather information 116.

Long-range climatological and/or meteorological forecasting may be generated by numerical weather prediction models, dynamical extended range weather forecast models that may involve multiple data assimilation systems and forecasting systems, or a combination of such models and systems. For example, data assimilation systems may be used to provide historic and current atmospheric and land surface initial conditions and also global ocean temperatures, and forecasting systems may incorporate the U.S. National Centers for Environmental Predictions (NCEP) Global Forecast System (GFS) for atmospheric predictions and the Geophysical Fluid Dynamics Laboratory Modular Ocean Model to provide sea-surface temperature predictions. Software and data supporting the above are publicly available from the NCEP.

Also, numerical weather prediction models (NWP) and/or surface networks may be combined with data from weather radars and satellites to reconstruct the current and near-term forecasted weather conditions on any particular area to be analyzed. There are numerous industry NWP models available, and any such models may be used as sources of meteorological data in the present invention. Examples of NWP models at least include RUC (Rapid Update Cycle), WRF (Weather Research and Forecasting Model), GFS (Global Forecast System) (as noted above), and GEM (Global Environmental Model). Meteorological data is received in real-time, and may come from several different NWP sources, such as from the European Centre for Medium-Range Weather Forecasting (ECMWF), Meteorological Services of Canada's (MSC) Canadian Meteorological Centre (CMC), as well as the National Oceanic and Atmospheric Administration's (NOAA) Environmental Modeling Center (EMC), and many others. The present invention may be configured to ingest weather data 113 from all types of NWP models, regardless of whether publicly, privately, or internally provided or developed.

Still further, real-time or current weather information 116 may be representative of assessments of localized weather conditions, and may be produced by many different sources of weather data 113 to provide one or more of observed weather data and current analyses of observed weather data, and predicted weather data, for example as data that is complementary to the data assimilation systems and forecasting systems noted above. Such additional sources of weather data may include data from both in-situ and remotely-sensed observation platforms.

Input data 110 may also include other traffic data elements that represent traffic speed-related information in a transportation network 102. For example, input data 110 may include incident data 117, which may or may not be provided by or derived from systems such as sensors. Incident data 117 may include information pertaining to non-moving objects within a roadway represented by a link 104 in the transportation network 102, that can cause abnormal pedestrian and/or vehicle movements, such as prone objects or pedestrians that may have fallen to the pavement. Other types of incidents include maintenance activities such as work zones (and vehicles present in the roadway for performing such activities), and a presence of unauthorized vehicles. Other sources of incident data 117 in addition to capture systems such as sensors include observation data that is provided directly by users in real-time, for example via applications resident on mobile devices, such as those associated with social media platforms. Still further, software installed on user devices may also provide such incident data 117 (or information from which incident data 117 may be derived), for example software providing GPS probe data and Bluetooth data; such data may be indicative of traffic conditions in or around a work zone within which maintenance activity is being conducted. Incident data 117 may therefore include, or be derived from, one or more sets of probe data provided by global positioning system devices, and data collected by a plurality of passive Bluetooth devices configured to read one or more of MAC addresses signal strength indicators emitted from Bluetooth devices in vehicles near where maintenance activity is or will occur.

Input data 110 may further include more static speed-related data for the roadway representing a link 104. This may include a posted speed limit, or an average historical speed for a particular location at a particular time; such information may be utilized, for example, to compare traffic speed estimates for the particular location and the particular time to anticipate congestion levels within the transportation network 102 as a forecast of a traffic state 180, as noted below.

Regardless of type, input data 110 is applied to a plurality of data processing elements 132 in the traffic speed modeling framework 100 that are components within a computing environment 130 that also includes one or more processors 133 and a plurality of software and hardware components. The one or more processors 133 and plurality of software and hardware components are configured to execute program instructions or routines to perform the mathematical functions, algorithms, machine learning, and other analytical approaches comprising the data processing functions described herein, and embodied within the plurality of data processing elements 132.

The plurality of data processing elements 132 include a data collection and initialization element 134 that is configured to ingest, receive, request, or otherwise obtain the input data 110 as noted above, and initialize the information represented therein for further processing within the traffic speed modeling framework 100. The plurality of data processing elements 132 also include, as noted above, a set of machine learning-based models, such as a partial-least-squares regression model 140, configured to execute one or more algorithms that predict 148 short-term traffic speed for each link 104 based on historical traffic speed 112, and a deep learning model 150 configured to execute one or more algorithms that generates a further prediction and forecast as an estimated traffic speed 160 at specific locations within the transportation network 102 and at specified times.

The machine learning-based, partial least squares (or PLS) regression model 140 is comprised of one or more machine learning algorithms that are configured to capture the spatial and temporal dependencies of traffic speed 112 in the link-based probe data 111, and accurately map and correlate a historical speed to an estimate of a future speed. These spatial and temporal dependencies are analyzed to predict 148 short-term traffic speed for each link 104, and develop a training dataset for the deep learning model(s) 150 that further adds weather data 113 and any other relevant information to generate such an estimate of future speed.

To predict 148 the short-term traffic speed for a given link 104, the PLS regression model 140 first selects link-based predictors 142 from relevant features in a feature space representing each link 104 in the transportation network 102 being modeled. The present invention then constructs a matrix 144, represented by X below and defined by a number of time steps and the selected link-based predictors for each link 104. Such a predictors matrix 144 may be represented as $$X \in R^{nd \times (mn_t)}$$

and is constructed using the historical speed data for m local links 104 over nd days (including nt time steps in each day):

$$X = (X1 X2 \ldots Xm)$$

where $X^k$ for every $k \in \{1, 2, \ldots, m\}$ is the traffic data matrix for link k.

Each row of the matrix 144 corresponds to a specific day in the dataset, and each column corresponds to the recorded data for link k for a certain time of the day. The matrix 144 generates a response (output) variable $Y \in R^{nd \times n\tau}$ in a response dataset 146 which represents speed for the next nτ time steps is defined in the same manner, except that it contains data for the prediction link 104 only.

The PLS regression model 140 applies a dimension reduction method that transforms the predictors and then fits a least-squares model using the transformed predictor variables, and is particularly helpful where the number of predictors (in this case, the variable X, which contains data from multiple links 104) is too large and greater than the number of observations, where using other techniques such as multiple linear regression would result in overfitting. The use of a partial least squares approach in the regression model 140 enables decomposition of the predictor matrix X and response dataset consisting of variables Y into new variables (which may be referred to as score matrices) between which the regression is performed.

The score matrices can be represented as T and U respectively, the decomposition is performed as follows:

$$X = TP^T + E_x$$

$$Y = UQ^T + E_y$$

where P and Q are the orthogonal loading matrices, and Ex and Ey are the matrices of residuals. The algorithm is computed in an iterative manner. It finds weight vectors w and c to create a linear combination of the columns of X and Y such that cov(t,u) is maximal, where the score vectors $t_i$ and $u_i$ are defined as $t_i = Xw_i$ and $u_i = Y_{ci}$.

PLS-based prediction in the regression model 140 is a decentralized approach, in which each link 104 predicts its own future speed based on local, historical speed 112. For every link 104 and each prediction period, the input matrix, $X \in Rn^{d \times (mn_t)}$, is constructed using traffic speed 112 for selected previous number of hours (in one example, the past 4 hours) ($n_t$=48) for the prediction link 104, and a selected number of immediate upstream and immediate downstream links 104 (m=11); continuing with the example above of a 4-hour window, the model analyzes the 5 immediate upstream and downstream links 104. The PLS regression model 140 thus predicts the average speed of the prediction link 104 for every five minutes within the next 2 hours ($n_\tau$=24).

The PLS-based regression model 140 of this example is trained using historical speed data over a preset period of time, for example 24 days. However, weekends and holidays are excluded from the dataset due to possessing different traffic patterns than on weekdays, producing a number of days of 17 ($n_d$=17). Hence, in training the model predictor matrix $X \in R^{17 \times (11 \times 48)}$ is used as the input, and the output variable $Y \in R^{17 \times 48}$ is constructed based on the speed over the next 2 hours. The speed data for a subsequent period of time is then used as the test set. When compared with the ground-truth values of speed and predicted speed for a representative link 104 during the AM and PM peak periods for a corresponding day, the predicted speed profile is smoother than the ground-truth speed profile.

Returning to FIG. 1, the output dataset 146 generated by the PLS regression model 140 (and representing short-term predicted traffic speed 148 for each link 104) is provided to the deep learning model 150 to generate a further prediction and forecast in an estimated traffic speed 160 at specific locations within the transportation network 102 and at specified times. The deep learning model 150 therefore applies the short-term traffic speed predictions 148 for each link 104, augments the dataset with additional information affecting traffic speed over longer time periods and at different locations, such as weather data 113, and generates traffic speed estimates 160 at those specific locations and specific times.

The deep learning model 150 is comprised at least of one or more machine learning algorithms that are configured to transform differential time sequences in the response dataset 146, by applying the spatial and temporal dependencies captured in the partial least squares regression model 140 as inputs to multiple neural networks that generate outputs representing further traffic speed estimates 160 based on the short-term traffic speed predictions 148. In one aspect of the present invention, these algorithms are embodied in a sequence-to-sequence (Seq2Seq) architecture 152 representing a multi-layered neural network (or multiple layers of neural networks). The Seq2Seq architecture 152 enables integration of weather data 113 with real-time traffic speed 112 from link-based probe data 111. The Seq2Seq architecture 152 may include an encoder 154, a decoder 155, and a fully-connected layer 156, as described further herein. FIG. 3 is a schematic illustration of a Seq2Seq architecture 152 for the deep learning model 150, as described further below.

Continuing with the numerical example expressed above, the operation of the deep learning model 150 may be further illustrated as follows. As noted above, the deep learning model 150 has two data sources: real-time traffic speed 112 in link-based probe data 111, and weather data 113. Traffic speed 112 and weather data 113 spanning several months are used in the present example, and as above, weekends and federal holidays have been excluded from the datasets. The real-time traffic speed 112 in the link-based probe data 111 includes 68 features representing historical traffic speed 112 from every link 104, while the weather data 113 consists of 2 features representing both precipitation and snow accumulation data for the geographical area 106 representing the links 104 being evaluated. There are also 3 additional temporal features representing the day, the hour, and the minute of each data point. These features are combined into a 2D matrix represented as $X \in R^{n \times m}$ where n is the number of time steps, and m is the number of input features. An overlapping sliding window approach is applied to convert this multivariate time series dataset into a supervised format that is suitable for training the deep learning model 150.

In order to assess the impact of weather data 113 on short-term predicted traffic speed 148, the deep learning model 150 may be trained using different types of data across the same historical time sequence to ascertain accuracy of performance; therefore, in different implementations of the present invention utilizing this deep learning model 150, different versions of input formats have been compared to assess the most appropriate set of inputs. Accordingly, the following illustrates an approach to ascertaining a training version of the deep learning model 150 that produces the most accurate outcome for traffic speed estimates 160.

In one version of training the deep learning model 150, only historical traffic speed data is considered, where inputs consist of 71 features (68 links, and 3 time features). In a second version, historical traffic and weather data are considered, where. The input consists of 73 features (68 links, 3 time features, and 2 weather features). A third version considered historical traffic and weather data as well as forecasted weather data, with inputs consisting of 75 features (68 links, 3 time features, 2 historical weather features, and 2 forecasted weather features). When used as an experiment in training models, the third version demonstrated much better performance at capturing the impact of weather on traffic speed than the first or second versions of the input formats.

Returning to FIG. 1, the Seq2Seq architecture 152 may further include one or more activation functions 158, which are mathematical constructs that help the deep learning model 150 and neural network(s) embodied therein learn complex patterns within data. Activation functions 150 operate to fire the next cell in a neural network, by taking the output signal from the previous cell and converting it into some form that can be taken as input to the next cell. Activation functions 158 are generally applied to introduce non-linearity to a neural network. Nevertheless, linear activation functions may also be utilized. For example, in one embodiment of the present invention, for fully connected layers 156 a ReLU (Rectified Linear Unit) algorithm is applied as the activation function 158; for the output layer, a different, linear activation function 158 may be utilized.

The deep learning model 150 generates a traffic speed estimate 160 at one or more locations of the transportation network 102, at one or more specified times. Such a traffic speed estimate 160 represents a further prediction generated by the machine learning models embodied within the traffic speed modeling framework 100, as a spatially- and temporally-relative forecast of a traffic speed, estimated for specific locations within a transportation network 102 at specific times.

These traffic speed estimates 160 may be utilized in the traffic speed modeling framework 100 in many different applications, and for many different use cases. For example, spatially- and temporally-relative traffic speed estimates 160 may be used for modeling and forecasting future traffic states 180, such as traffic bottleneck prediction 181, in the transportation network 102 at the specific locations and/or at specified times. They may also be used to model or forecast any other future traffic state 180 in the transportation network 102 at the specified times, such as for example volume, flow, and travel time for the transportation network 102, which may represent congestion at the specific link 104 due to a slowdown in speed relative to a posted or average speed at a specified time.

The traffic speed estimate 160 may be represented as, and considered as, output data 170 that is used for follow-on uses both internal to the traffic speed modeling framework 100, and external to the traffic speed modeling framework 100. It is to be understood that there are many applications of, and use cases for, traffic speed estimates 160, and is not to be limited to any one application or any one use case specifically discussed herein. It is to be further understood that a spatially- and temporally-relative traffic speed estimate 160 is useful in and of itself for transportation infrastructure planning and management, and may therefore itself by an output of the traffic speed modeling framework 100, in addition to and separate from any specific output delineated herein.

Output data 170 may take many different forms, in addition to providing signals representing a traffic speed estimate 160 at a particular location and/or at a particular time. The traffic speed modeling framework 100 may actuate traffic signaling and messaging systems, for example by generating signals or instructions for a transportation management system 182. This may include instructions to adjust traffic signal controllers 183 (for example, to adjust a phase cycle or timing in response to a traffic speed estimate 160). Such signals or instructions may also include instructions to adjust on-ramp or ingress signals 184 (for example, in a highway or freeway network having on ramps), instructions to generate and broadcast messages for vehicles 185 near to the location represented in traffic speed estimate, and instructions to generate and broadcast messages for public display 186 (for example, on message boards positioned proximate to a roadway at or near a location represented in the traffic speed estimate 160). Other types of messaging and alerting is also possible. For example, the present invention may be configured to generate route recommendations for a planned trip, as well as one or more alternate route recommendations, based on the forecasts and predictions of the framework 100 from traffic speed estimates 160 at specific locations within the transportation network 102 and at specified times, and any of such route recommendations may be disseminated through messages and alerts provided to users or user devices.

Other types of outputs and uses of traffic speed estimates 160 are also possible, include reporting and analytics 187 (such as incident analyses and alerts) and display and visualization 188 of information generated by the traffic speed modeling framework 100 on a graphical user interface, for example to a traffic modeling support tool 190. Yet another output and use of traffic speed estimates 160 may include recommendations that prioritize roadway maintenance, such as for example routing of snowplows and other clearance and safety equipment in or following adverse weather events to most reduce delay within the transportation network 102.

Still further, the present invention may be configured to generate instructions for autonomous control of vehicles within the transportation network 102 based on route recommendations derived from traffic speed estimates 160 at specific locations and at specified times. Such instructions may be communicated directly to vehicles to control operation of such vehicles, and such vehicles may include any type of vehicle operating within the transportation network 102, including autonomously-operated passenger vehicles and commercial vehicles such as those delivering packages or other items. Instructions may also be provided to remote operators in the case of remote piloting of such vehicles. Regardless, this embodiment includes instructions generated for autonomous and/or remote control of roadway maintenance vehicles such as snowplows and other clearance and safety equipment in or following adverse weather events, for routing and operation of such vehicles.

The present invention may also include, as noted above, a traffic modeling support tool 190, and such a tool 190 is one way that a user may view and interact with the traffic speed modeling framework 100, and configure various aspects thereof. For example, users may configure the traffic speed modeling framework 100 to manually adjust timing and phases of traffic signals, define links or specific locations in a transportation network 102 that are of interest, define specific time periods of interest, and generally manually adjust inputs to the traffic speed modeling framework 100. Additionally, output data 170 may be provided directly to the traffic modeling support tool 190.

A user may configure and interact with the traffic speed modeling framework 100 using the traffic modeling support tool 190 via an application resident on a computing device, such as a desktop, laptop, tablet, mobile, wearable, or other computer, and/or using a graphical user interface. The traffic modeling support tool 190 may include widgets, drop-down menus, and other indicia presented via the application and graphical user interface that enable a user to make selections and perform functions attendant to operation of the precision traffic speed modeling framework 100.

Figure 2:
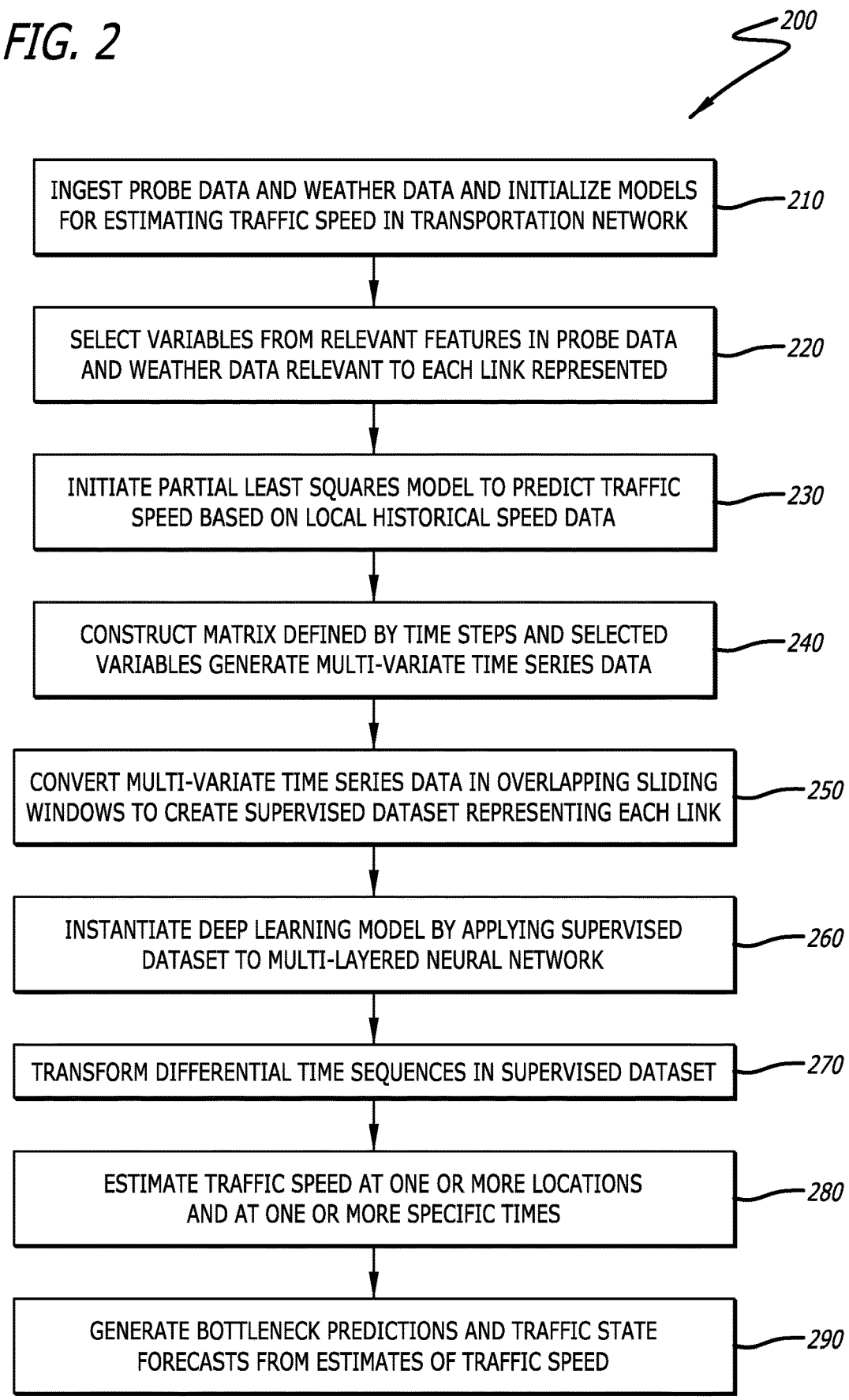
FIG. 2 is a flowchart of steps in a process of performing the traffic speed modeling framework according to one embodiment of the present invention.

FIG. 2 is a flowchart illustrating steps in a process 200 for performing the traffic speed modeling framework 100, according to one or more embodiments of the present invention. Such a process 200 may include, as noted above one or more functions, mathematical models, algorithms, machine learning processes, and data processing techniques for the data processing elements 132 within such a framework 100, and for the various functions of each element 132.

The process 200 is initialized at step 210 by ingesting input data 110 that includes probe data 111 and weather data 113, preparing this input data 110 for processing within the machine learning-based models, and initializing the machine learning-based models for estimating traffic speed in a transportation network 102. At step 220, variables representing the predictor space are selected from relevant features of the probe data 111 and weather data 113, where appropriate, for each link 104 represented in those sets of input data 110. The process 200 then initiates the partial least squares (PLS) regression model 140 to predict traffic speed based on the local, historical data contained in the ingested input data 110 at step 230.

The process 200 also constructs a matrix 144 defined by time steps and variables selected at step 220 to generate multi-variate time series data 146 at step 240. This may be converted at step 250 into supervised dataset representing each link 104 in the transportation network 102 for further application to deep learning model(s) 150, for example using processing techniques such as overlapping sliding windows. At step 260, one or more deep learning models 150 are instantiated by applying the supervised dataset to train one or more multi-layered neural networks.

The multi-layered neural network may be comprised of a Seq2Seq architecture 152 that includes an encoder 154 generating a hidden neural network state representing the multivariate time-series data, a decoder 155 generating an output sequence, and a fully-connected layer 156. At step 270, this Seq2Seq architecture 152 transforms differential time sequences in the supervised dataset at least by reducing overfitting to ensure that datasets for each time period have the same length, so that the decoder 155 can predict a sequence at a next timestep in time. At step 280, the multi-layered neural network products an output represented as a traffic speed estimate 160 at one or more locations in the transportation network 102, and at one or more specified times. At step 290, the traffic speed modeling framework 100 and process 200 generate forecasts of traffic states 180 such as bottleneck predictions 181 from the traffic speed estimates 160.

FIG. 3A and FIG. 3B are schematic illustrations of elements of an exemplary deep learning model 150 in the traffic speed modeling framework 100 having a Seq-to-Seq architecture 152, according to one embodiment of the present invention. FIG. 3A is an illustration of encoder 154 and decoder 155 units of the Seq2Seq architecture 152, while FIG. 2B is a higher-level illustration of a deep learning model 150 that includes neural networks comprised of such a Seq2Seq architecture 152 having encoders 154 and decoders 155. As noted above, the encoder 152 takes in the input time series x 310, and generates a hidden state h 320 which in turn is provided to the decoder 155 to generate an output sequence y 330 as demonstrated in FIG. 3A. The output sequence y 330 of the decoder 155 at each time step is then provided to a fully connected layer 156 for further processing before producing a final output.

FIG. 3B is as noted above a higher-level illustration of multi-layered neural network as applied by the deep learning model 150. The deep learning model 150 includes a memory unit C 340 which is regulated by three gates: an input gate i 342, a forget gate f 344, and an output gate o 346. The input gate i 342 controls the contribution of the input to the memory unit C 340, the forget gate f 344 controls what parts of the memory unit C 340 to keep, and the output gate o 346 controls the contribution of the memory unit C 340 to the output of the LSTM. As with FIG. 3A, the hidden state h 320 represents the output of the encoder 154 while the input of the network is represented with s 350. The state of each memory unit C 340 is recorded and recurrently self-connected.

The Seq2Seq architecture 152 is, according to one embodiment of the present invention, an implementation of Long Short-Term Memory (LSTM) neural networks, which are an adaptation of Recurrent Neural Networks (RNN) designed to model long-term time dependencies in data sequences, which traffic speed 112 exhibits. LSTMs are implemented to avoid the diminishing gradient problem inherent to RNNs, when time series have long time lags, and produce more accurate estimates of traffic speed.

The state of the memory unit C 340 is recorded and recurrently self-connected; the formulations to compute the gates and states are given in the following equations:

$$F_t = \sigma(W_F \cdot [h_{t-1}, s_t] + b_F),$$

$$I_t = \sigma(W_I \cdot [h_{t-1}, s_t] + b_I),$$

$$\tilde{C}_t = \tanh(W_C \cdot [h_{t-1}, s_t] + b_C),$$

$$C_t = F_t * C_{t-1} + I_t * \tilde{C}_t,$$

$$O_t = \sigma(WO \cdot [h_{t-1}, s_t] + b_O),$$

$$h_t = O_t * \tanh(C_t)$$

where C represents the updated state, W is the weights matrix, b is the bias vector for each gate, $s_t$ is the input to the network at time t, and * denotes the Hadamard product. The forget gate f 344 reduces overfitting by controlling how an incoming input contributes to the hidden state h 320. This structure is the main reason why LSTMs do not suffer from the vanishing gradient problem observed by RNNs.

The encoder 154 and the decoder 155 may each be a separate LSTM-type neural network. The encoder 154 takes in the input time series, and generates a hidden state h 320 which in turn is fed to the decoder 155 to generate an output sequence y 330. The output of the decoder 155 at each time step is then fed to the fully-connected layer 156 for further processing before producing the final output Onn. This final output of the network Onn may then be used in a loss function, considering the ground truth output Oact, to further train the multi-layer neural network(s).

Aspects of the present specification can also be described by the following embodiments:

1. A method of characterizing traffic congestion in a transportation network, comprising:
receiving, as input data, probe data that includes localized, historical link-based speed information in a transportation network, and weather data that includes historical weather conditions and forecasted weather conditions for a geographical area that includes the transportation network;
analyzing the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to characterize spatio-temporal dependencies in traffic speed, by:
  selecting one or more predictors from features in the input data relevant to each link in the transportation network,
  constructing a matrix defined by a number of time steps, and a plurality of features representing temporal characteristics in each data point, the weather data, and the one or more predictors selected for each link,
  generating a multi-variate time-series dataset representing a predicted short-term traffic speed for each link from the matrix,
  transforming differential time sequences in the multi-variate time-series dataset in a multi-layered neural network having a sequence-to-sequence architecture comprised of an encoder generating a hidden neural network state representing the multivariate time-series data, a decoder generating an output sequence, and a fully-connected layer that generates an estimate of traffic speed at one or more locations of the transportation network at one or more specified times; and
forecasting a traffic state in the transportation network at the one or more specified times, from the estimate of the traffic speed, wherein the forecasting a traffic state includes predicting traffic bottlenecks in the transportation network.

2. The method of claim 1, wherein the traffic bottlenecks represent predicted delays characterized by a reduction in traffic speed across a specific distance comprised of one or more links.

3. The method of claim 1, wherein a forecast of the traffic state includes a forecast of one or more of volume, flow, and travel time for the transportation network at the one or more specified times.

4. The method of claim 1, further comprising generating visualizations of the one or more of a prediction of traffic bottlenecks in the transportation network, and a forecast of a traffic state in the transportation network at one or more specified times, for a graphical user interface.

5. The method of claim 1, wherein the predictors include traffic speed features representing link-based speed data from every link, weather features representing meteorological data representing precipitation and snow accumulation for a geographical area having one or more links, and temporal features representing a day, hour, and minute of each data point in the link-based speed data.

6. The method of claim 1, wherein the link-based speed information is segmented based on variances in the transportation network, the variance including changes in geometry, intersections, changes in posted speed limit, and lane configuration.

7. The method of claim 1, wherein the weather data further includes current weather data and predicted weather conditions for the geographical area that includes the transportation network.

8. The method of claim 1, wherein the forecasted weather conditions include near-term weather forecasts and extended-range weather forecasts.

9. The method of claim 1, wherein the input data further includes traffic incident data relative to the transportation network.

10. The method of claim 1, further comprising applying an activation function at an output of the multi-layered neural network to derive the estimate of the traffic speed at the one or more locations.

11. A method, comprising:
modeling spatio-temporal dependencies in traffic speed from input data comprised of probe data that includes localized, historical link-based speed information in a transportation network, and weather data that includes historical weather conditions and forecasted weather conditions for a geographical area that includes the transportation network, by:
  selecting one or more predictors from features in the input data relevant to each link in the transportation network,
  predicting short-term traffic speed for each link, by constructing a matrix defined by a number of time steps, and a plurality of features representing temporal characteristics in each data point, the weather data, and the one or more predictors for each link, and generating a multi-variate time series dataset for each link from the matrix,
  estimating a traffic speed at one or more locations of the transportation network at one or more specified times, by applying the multi-variate time-series dataset to a multi-layered neural network to transform differential time sequences in the multi-variate time-series dataset, the multi-layered neural network having a sequence-to-sequence architecture comprised of an encoder generating a hidden neural network state representing the multivariate time-series data, a decoder generating an output sequence, and a fully-connected layer,
analyzing an estimate of the traffic speed at the one or more locations of the transportation network to forecast a traffic state in the transportation network at the one or more specified times, where traffic state includes traffic bottlenecks characterized by a reduction in traffic speed across a specific distance comprised of one or more links in the transportation network.

12. The method of claim 11, wherein the traffic bottlenecks represent predicted delays characterized by a reduction in traffic speed across a specific distance comprised of one or more links.

13. The method of claim 11, wherein a forecast of the traffic state includes a forecast of one or more of volume, flow, and travel time for the transportation network at the one or more specified times.

14. The method of claim 11, further comprising generating visualizations of the one or more of a prediction of traffic bottlenecks in the transportation network, and a forecast of a traffic state in the transportation network at one or more specified times, for a graphical user interface.

15. The method of claim 11, wherein the predictors include traffic speed features representing link-based speed data from every link, weather features representing meteorological data representing precipitation and snow accumulation for a geographical area having one or more links, and temporal features representing a day, hour, and minute of each data point in the link-based speed data.

16. The method of claim 11, wherein the link-based speed information is segmented based on variances in the transportation network, the variance including changes in geometry, intersections, changes in posted speed limit, and lane configuration.

17. The method of claim 11, wherein the weather data further includes current weather data and predicted weather conditions for the geographical area that includes the transportation network.

18. The method of claim 11, wherein the forecasted weather conditions include near-term weather forecasts and extended-range weather forecasts.

19. The method of claim 11, wherein the input data further includes traffic incident data relative to the transportation network.

20. The method of claim 11, wherein the modeling spatio-temporal dependencies in traffic speed further comprises applying an activation function at an output of the multi-layered neural network to derive the estimate of the traffic speed at the one or more locations.

21. A system for characterizing traffic congestion in a transportation network, comprising:
a data collection element configured to receive input data comprised of probe data that includes localized, historical link-based speed information in a transportation network, and weather data that includes historical weather conditions and forecasted weather conditions for a geographical area that includes the transportation network;
one or more machine learning models, configured to analyze the input data to characterize spatio-temporal dependencies in traffic speed, the one or more machine learning models including:
  a partial least squares regression model configured to predict short-term traffic speed, by
    selecting one or more predictors from features in the input data relevant to each link in the transportation network,
    constructing a matrix defined by a number of time steps, and a plurality of features representing temporal characteristics in each data point, the weather data and the one or more predictors selected for each link to generate a multi-variate time-series dataset from the matrix representing a predicted short-term traffic speed for each link; and
  a deep learning model configured to transform differential time sequences in the multi-variate time-series dataset and estimate a traffic speed at one or more locations of the transportation network at one or more specified times, the deep learning model comprised of a multi-layered neural having a sequence-to-sequence architecture that includes an encoder generating a hidden neural network state representing the multivariate time-series data, a decoder generating an output sequence, and a fully-connected layer,
wherein a forecast of a traffic state in the transportation network at one or more specified times is generated from the estimate of the traffic speed at the one or more locations, the forecast of a traffic state including a prediction of traffic bottlenecks characterized by a reduction in traffic speed across a specific distance comprised of one or more links in the transportation network.

22. The system of claim 21, wherein the prediction of traffic bottlenecks represents predicted delays characterized by a reduction in traffic speed across a specific distance comprised of one or more links.

23. The system of claim 21, wherein the forecast of the traffic state includes a forecast of one or more of volume, flow, and travel time for the transportation network at the one or more specified times.

24. The system of claim 21, further comprising a display element configured to generate one or more images representing the one or more of a prediction of traffic bottlenecks in the transportation network, and a forecast of a traffic state in the transportation network at one or more specified times, on a graphical user interface.

25. The system of claim 21, wherein the predictors include traffic speed features representing link-based speed data from every link, weather features representing meteorological data representing precipitation and snow accumulation for a geographical area having one or more links, and temporal features representing a day, hour, and minute of each data point in the link-based speed data.

26. The system of claim 21, wherein the link-based speed information is segmented based on variances in the transportation network, the variance including changes in geometry, intersections, changes in posted speed limit, and lane configuration.

27. The system of claim 21, wherein the weather data further includes current weather data and predicted weather conditions for the geographical area that includes the transportation network.

28. The system of claim 21, wherein the forecasted weather conditions include near-term weather forecasts and extended-range weather forecasts.

29. The system of claim 21, wherein the input data further includes traffic incident data relative to the transportation network.

30. The system of claim 21, wherein an activation function is applied at an output of the multi-layered neural network to derive the traffic speed at each link.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs, GPUs, TPUs, and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of characterizing traffic congestion in a transportation network, comprising:

receiving, as input data, probe data that includes localized, historical link-based speed information in a transportation network, and weather data that includes historical weather conditions and forecasted weather conditions for a geographical area that includes the transportation network;

analyzing the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to characterize spatio-temporal dependencies in traffic speed, by:

selecting one or more predictors from features in the input data relevant to each link in the transportation network, constructing a matrix defined by a number of time steps, and a plurality of features representing temporal characteristics in each data point, the weather data, and the one or more predictors selected for each link, generating a multi-variate time-series dataset representing a predicted short-term traffic speed for each link from the matrix, transforming differential time sequences in the multi-variate time-series dataset in a multi-layered neural network having a sequence-to-sequence architecture comprised of an encoder generating a hidden neural network state representing the multivariate time-series data, a decoder generating an output sequence, and a fully-connected layer that generates an estimate of traffic speed at one or more locations of the transportation network at one or more specified times; and forecasting a traffic state in the transportation network at the one or more specified times, from the estimate of the traffic speed, wherein the forecasting a traffic state includes predicting traffic bottlenecks in the transportation network, wherein one or more of a traffic signal controller is adjusted, and a recommended route is updated, from the estimate of the traffic speed.

2. The method of claim 1, wherein the traffic bottlenecks represent predicted delays characterized by a reduction in traffic speed across a specific distance comprised of one or more links.

3. The method of claim 1, wherein a forecast of the traffic state includes a forecast of one or more of volume, flow, and travel time for the transportation network at the one or more specified times.

4. The method of claim 1, further comprising generating visualizations of the one or more of a prediction of traffic bottlenecks in the transportation network, and a forecast of a traffic state in the transportation network at one or more specified times, for a graphical user interface.

5. The method of claim 1, wherein the predictors include traffic speed features representing link-based speed data from every link, weather features representing meteorological data representing precipitation and snow accumulation for a geographical area having one or more links, and temporal features representing a day, hour, and minute of each data point in the link-based speed data.

6. The method of claim 1, wherein the link-based speed information is segmented based on variances in the transportation network, the variance including changes in geometry, intersections, changes in posted speed limit, and lane configuration.

7. The method of claim 1, wherein the weather data further includes current weather data and predicted weather conditions for the geographical area that includes the transportation network.

8. The method of claim 1, wherein the forecasted weather conditions include near-term weather forecasts and extended-range weather forecasts.

9. The method of claim 1, wherein the input data further includes traffic incident data relative to the transportation network.

10. The method of claim 1, further comprising applying an activation function at an output of the multi-layered neural network to derive the estimate of the traffic speed at the one or more locations.

11. A method, comprising:
modeling spatio-temporal dependencies in traffic speed from input data comprised of probe data that includes localized, historical link-based speed information in a transportation network, and weather data that includes historical weather conditions and forecasted weather conditions for a geographical area that includes the transportation network, by:
selecting one or more predictors from features in the input data relevant to each link in the transportation network,
predicting short-term traffic speed for each link, by constructing a matrix defined by a number of time steps, and a plurality of features representing temporal characteristics in each data point, the weather data, and the one or more predictors for each link, and generating a multi-variate time series dataset for each link from the matrix, estimating a traffic speed at one or more locations of the transportation network at one or more specified times, by applying the multi-variate time-series dataset to a multi-layered neural network to transform differential time sequences in the multi-variate time-series dataset, the multi-layered neural network having a sequence-to-sequence architecture comprised of an encoder generating a hidden neural network state representing the multivariate time-series data, a decoder generating an output sequence, and a fully-connected layer; and analyzing an estimate of the traffic speed at the one or more locations of the transportation network to forecast a traffic state in the transportation network at the one or more specified times, where the traffic state includes traffic bottlenecks characterized by a reduction in traffic speed across a specific distance comprised of one or more links in the transportation network, wherein one or more of a traffic signal controller is adjusted, and a recommended route is updated, from the estimate of the traffic speed.

12. The method of claim 11, wherein the traffic bottlenecks represent predicted delays characterized by a reduction in traffic speed across a specific distance comprised of one or more links.

13. The method of claim 11, wherein a forecast of the traffic state includes a forecast of one or more of volume, flow, and travel time for the transportation network at the one or more specified times.

14. The method of claim 11, further comprising generating visualizations of the one or more of a prediction of traffic bottlenecks in the transportation network, and a forecast of a traffic state in the transportation network at one or more specified times, for a graphical user interface.

15. The method of claim 11, wherein the predictors include traffic speed features representing link-based speed data from every link, weather features representing meteorological data representing precipitation and snow accumulation for a geographical area having one or more links, and temporal features representing a day, hour, and minute of each data point in the link-based speed data.

16. The method of claim 11, wherein the link-based speed information is segmented based on variances in the transportation network, the variance including changes in geometry, intersections, changes in posted speed limit, and lane configuration.

17. The method of claim 11, wherein the weather data further includes current weather data and predicted weather conditions for the geographical area that includes the transportation network.

18. The method of claim 11, wherein the forecasted weather conditions include near-term weather forecasts and extended-range weather forecasts.

19. The method of claim 11, wherein the input data further includes traffic incident data relative to the transportation network.

20. The method of claim 11, wherein the modeling spatio-temporal dependencies in traffic speed further comprises applying an activation function at an output of the multi-layered neural network to derive the estimate of the traffic speed at the one or more locations.

21. A system for characterizing traffic congestion in a transportation network, comprising:
a data collection element configured to receive input data comprised of probe data that includes localized, historical link-based speed information in a transportation network, and weather data that includes historical weather conditions and forecasted weather conditions for a geographical area that includes the transportation network; and one or more machine learning models, configured to analyze the input data to characterize spatio-temporal dependencies in traffic speed, the one or more machine learning models including:
- a partial least squares regression model configured to predict short-term traffic speed, by
  - selecting one or more predictors from features in the input data relevant to each link in the transportation network,
  - constructing a matrix defined by a number of time steps, and a plurality of features representing temporal characteristics in each data point, the weather data and the one or more predictors selected for each link to generate a multi-variate time-series dataset from the matrix representing a predicted short-term traffic speed for each link, and
- a deep learning model configured to transform differential time sequences in the multi-variate time-series dataset and estimate a traffic speed at one or more locations of the transportation network at one or more specified times, the deep learning model comprised of a multi-layered neural having a sequence-to-sequence architecture that includes an encoder generating a hidden neural network state representing the multivariate time-series data, a decoder generating an output sequence, and a fully-connected layer, wherein a forecast of a traffic state in the transportation network at one or more specified times is generated from the estimate of the traffic speed at the one or more locations, the forecast of a traffic state including a prediction of traffic bottlenecks characterized by a reduction in traffic speed across a specific distance comprised of one or more links in the transportation network, and wherein one or more of a traffic signal controller is adjusted, and a recommended route is updated, from the estimate of the traffic speed.

22. The system of claim 21, wherein the prediction of traffic bottlenecks represents predicted delays characterized by a reduction in traffic speed across a specific distance comprised of one or more links.

23. The system of claim 21, wherein the forecast of the traffic state includes a forecast of one or more of volume, flow, and travel time for the transportation network at the one or more specified times.

24. The system of claim 21, further comprising a display element configured to generate one or more images representing the one or more of a prediction of traffic bottlenecks in the transportation network, and a forecast of a traffic state in the transportation network at one or more specified times, on a graphical user interface.

25. The system of claim 21, wherein the predictors include traffic speed features representing link-based speed data from every link, weather features representing meteorological data representing precipitation and snow accumulation for a geographical area having one or more links, and temporal features representing a day, hour, and minute of each data point in the link-based speed data.

26. The system of claim 21, wherein the link-based speed information is segmented based on variances in the transportation network, the variance including changes in geometry, intersections, changes in posted speed limit, and lane configuration.

27. The system of claim 21, wherein the weather data further includes current weather data and predicted weather conditions for the geographical area that includes the transportation network.

28. The system of claim 21, wherein the forecasted weather conditions include near-term weather forecasts and extended-range weather forecasts.

29. The system of claim 21, wherein the input data further includes traffic incident data relative to the transportation network.

30. The system of claim 21, wherein an activation function is applied at an output of the multi-layered neural network to derive the traffic speed at each link.

* * * * *